United States Patent
Bates et al.

(10) Patent No.: US 10,627,983 B2
(45) Date of Patent: *Apr. 21, 2020

(54) GENERATING DATA FOR MANAGING ENCOUNTERS IN A VIRTUAL WORLD ENVIRONMENT

(71) Applicant: ACTIVISION PUBLISHING, INC., Santa Monica, CA (US)

(72) Inventors: Cary Lee Bates, Rochester, MN (US); Jim Chun-Ta Chen, Rochester, MN (US); Zachary Adam Garbow, Rochester, MN (US); Gregory Edward Young, St. Paul, MN (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 985 days.

This patent is subject to a terminal disclaimer.

(21) Appl. No.: 14/293,301

(22) Filed: Jun. 2, 2014

(65) Prior Publication Data

US 2014/0344725 A1 Nov. 20, 2014

Related U.S. Application Data

(63) Continuation of application No. 11/963,883, filed on Dec. 24, 2007, now abandoned.

(51) Int. Cl.
*G06F 3/0481* (2013.01)
*G06F 3/0484* (2013.01)
*G06Q 10/10* (2012.01)

(52) U.S. Cl.
CPC ...... *G06F 3/04815* (2013.01); *G06F 3/04842* (2013.01); *G06Q 10/10* (2013.01)

(58) Field of Classification Search
CPC ............. G06N 3/006; A63F 2300/8082; G06F 3/04815; G06F 3/04842; G06Q 10/10
See application file for complete search history.

(56) References Cited

U.S. PATENT DOCUMENTS 3,621,214 A 11/1971 Romney
3,736,564 A 5/1973 Watkins
(Continued)

FOREIGN PATENT DOCUMENTS

AU 768367 3/2004
AU 2005215048 10/2011
(Continued)

OTHER PUBLICATIONS

U.S. Patent Application entitled "System for Managing Encounters in a Virtual World Environment", filed Dec. 21, 2007, U.S. Appl. No. 11/962,841.
(Continued)

*Primary Examiner* — William L Bashore
*Assistant Examiner* — Daniel W Parcher
(74) *Attorney, Agent, or Firm* — Novel IP

(57) ABSTRACT

Embodiments of the invention provide techniques for providing information for avoiding specific users of an immersive virtual environment. Generally, a primary user may specify other users to be avoided in a blacklist. The blacklisted users may be specified to be avoided at all times, or may be specified to be avoided in certain situations. In one embodiment, a user may be added to the blacklist during a specific situation, resulting in the characteristics of the situation being automatically stored in the blacklist. Subsequently, the blacklist may be used to determine the locations of the blacklisted users matching the current situation. The primary user may then avoid the locations having the greatest probability of encountering blacklisted users.

18 Claims, 4 Drawing Sheets

(56) References Cited

U.S. PATENT DOCUMENTS

| | | |
|---|---|---|
| 3,792,243 A | 2/1974 | Appel |
| 3,996,672 A | 12/1976 | Osofsky |
| 4,461,301 A | 7/1984 | Ochs |
| 4,841,292 A | 6/1989 | Zeno |
| 4,879,849 A | 11/1989 | Hollingsworth |
| 4,895,376 A | 1/1990 | Chiang |
| 4,902,469 A | 2/1990 | Watson |
| 4,908,761 A | 3/1990 | Tai |
| 4,970,666 A | 11/1990 | Welsh |
| 5,015,188 A | 5/1991 | Pellosie |
| 5,031,089 A | 7/1991 | Liu |
| 5,058,180 A | 10/1991 | Khan |
| 5,130,794 A | 7/1992 | Ritchey |
| 5,179,656 A | 1/1993 | Lisle |
| 5,255,352 A | 10/1993 | Falk |
| 5,276,785 A | 1/1994 | MacKinlay |
| 5,287,437 A | 2/1994 | Deering |
| 5,295,234 A | 3/1994 | Ishida |
| 5,310,349 A | 5/1994 | Daniels |
| 5,325,472 A | 6/1994 | Horiuchi |
| 5,333,272 A | 7/1994 | Capek |
| 5,339,390 A | 8/1994 | Robertson |
| 5,347,628 A | 9/1994 | Brewer |
| 5,367,614 A | 11/1994 | Bisey |
| 5,371,673 A | 12/1994 | Fan |
| 5,371,851 A | 12/1994 | Pieper |
| 5,381,158 A | 1/1995 | Takahara |
| 5,381,526 A | 1/1995 | Ellson |
| 5,432,895 A | 7/1995 | Myers |
| 5,442,569 A | 8/1995 | Osano |
| 5,442,733 A | 8/1995 | Kaufman |
| 5,452,414 A | 9/1995 | Rosendahl |
| 5,498,003 A | 3/1996 | Gechter |
| 5,502,638 A | 3/1996 | Takenaka |
| 5,522,018 A | 5/1996 | Takeda |
| 5,530,796 A | 6/1996 | Wang |
| 5,535,276 A | 7/1996 | Ganesan |
| 5,537,618 A | 7/1996 | Boulton |
| 5,539,883 A | 7/1996 | Allon |
| 5,555,354 A | 9/1996 | Strasnick |
| 5,561,736 A | 10/1996 | Moore |
| 5,563,946 A | 10/1996 | Cooper |
| 5,577,981 A | 11/1996 | Jarvik |
| 5,584,700 A | 12/1996 | Feldman |
| 5,594,644 A | 1/1997 | Hasegawa |
| 5,594,859 A | 1/1997 | Palmer |
| 5,621,906 A | 4/1997 | ONeill |
| 5,630,129 A | 5/1997 | Wheat |
| 5,633,993 A | 5/1997 | Redmann |
| 5,662,523 A | 9/1997 | Yasumaru |
| 5,675,746 A | 10/1997 | Marshall |
| 5,680,524 A | 10/1997 | Maples |
| 5,685,775 A | 11/1997 | Bakoglu |
| 5,696,892 A | 12/1997 | Redmann |
| 5,702,307 A | 12/1997 | Moran |
| 5,706,507 A | 1/1998 | Schloss |
| 5,708,764 A | 1/1998 | Borrel |
| 5,734,805 A | 3/1998 | Isensee |
| 5,736,982 A | 4/1998 | Suzuki |
| 5,736,985 A | 4/1998 | Lection |
| 5,736,990 A | 4/1998 | Barrus |
| 5,737,416 A | 4/1998 | Cooper |
| 5,737,533 A | 4/1998 | De |
| 5,737,619 A | 4/1998 | Judson |
| 5,745,113 A | 4/1998 | Jordan |
| 5,745,678 A | 4/1998 | Herzberg |
| 5,745,711 A | 4/1998 | Kitahara |
| 5,761,083 A | 6/1998 | Brown |
| 5,762,552 A | 6/1998 | Vuong |
| 5,764,912 A | 6/1998 | Rosborough |
| 5,768,511 A | 6/1998 | Galvin |
| 5,774,668 A | 6/1998 | Choquier |
| 5,796,393 A | 8/1998 | MacNaughton |
| 5,802,294 A | 9/1998 | Ludwig |
| 5,825,877 A | 10/1998 | Dan |
| 5,835,094 A | 11/1998 | Ermel |
| 5,835,692 A | 11/1998 | Cragun |
| 5,850,225 A | 12/1998 | Cosman |
| 5,854,897 A | 12/1998 | Radziewicz |
| 5,860,137 A | 1/1999 | Raz |
| 5,862,337 A | 1/1999 | Gray |
| 5,875,296 A | 2/1999 | Shi |
| 5,878,233 A | 3/1999 | Schloss |
| 5,880,731 A | 3/1999 | Liles |
| 5,883,628 A | 3/1999 | Mullaly |
| 5,884,024 A | 3/1999 | Lim |
| 5,884,029 A | 3/1999 | Brush |
| 5,898,423 A | 4/1999 | Tognazzini |
| 5,900,879 A | 5/1999 | Berry |
| 5,903,266 A | 5/1999 | Berstis |
| 5,903,271 A | 5/1999 | Bardon |
| 5,908,469 A | 6/1999 | Botz |
| 5,911,045 A | 6/1999 | Leyba |
| 5,919,045 A | 7/1999 | Tagge |
| 5,920,325 A | 7/1999 | Morgan |
| 5,923,324 A | 7/1999 | Berry |
| 5,926,179 A | 7/1999 | Matsuda |
| 5,933,818 A | 8/1999 | Kasravi |
| 5,938,722 A | 8/1999 | Johnson |
| 5,944,824 A | 8/1999 | He |
| 5,963,915 A | 10/1999 | Kirsch |
| 5,966,129 A | 10/1999 | Matsukuma |
| 5,969,720 A | 10/1999 | Lisle |
| 5,969,724 A | 10/1999 | Berry |
| 5,977,979 A | 11/1999 | Clough |
| 5,978,841 A | 11/1999 | Berger |
| 5,982,372 A | 11/1999 | Brush |
| 5,983,003 A | 11/1999 | Lection |
| 5,990,888 A | 11/1999 | Blades |
| 5,990,896 A | 11/1999 | Barrus |
| 6,003,065 A | 12/1999 | Yan |
| 6,006,223 A | 12/1999 | Agrawal |
| 6,008,848 A | 12/1999 | Tiwari |
| 6,009,455 A | 12/1999 | Doyle |
| 6,014,145 A | 1/2000 | Bardon |
| 6,018,734 A | 1/2000 | Zhang |
| 6,021,268 A | 2/2000 | Johnson |
| 6,023,270 A | 2/2000 | Brush |
| 6,023,698 A | 2/2000 | Lavey |
| 6,025,839 A | 2/2000 | Schell |
| 6,037,950 A | 3/2000 | Meir |
| 6,049,819 A | 4/2000 | Buckle |
| 6,058,266 A | 5/2000 | Megiddo |
| 6,059,842 A | 5/2000 | Dumarot |
| 6,064,389 A | 5/2000 | Berry |
| 6,069,632 A | 5/2000 | Mullaly |
| 6,070,143 A | 5/2000 | Barney |
| 6,081,270 A | 6/2000 | Berry |
| 6,081,271 A | 6/2000 | Bardon |
| 6,088,727 A | 7/2000 | Hosokawa |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,115,718 A | 9/2000 | Huberman |
| 6,134,588 A | 10/2000 | Guenthner |
| 6,137,904 A | 10/2000 | Lubin |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,216,098 B1 | 4/2001 | Clancey |

(56) References Cited

U.S. PATENT DOCUMENTS

| | | | |
|---|---|---|---|
| 6,219,045 B1* | 4/2001 | Leahy | G06F 3/048 709/204 |
| 6,222,551 B1 | 4/2001 | Schneider | |
| 6,226,009 B1 | 5/2001 | Carraro | |
| 6,233,583 B1 | 5/2001 | Hoth | |
| 6,249,779 B1 | 6/2001 | Hitt | |
| 6,256,043 B1 | 7/2001 | Aho | |
| 6,266,649 B1 | 7/2001 | Linden | |
| 6,271,842 B1 | 8/2001 | Bardon | |
| 6,271,843 B1 | 8/2001 | Lection | |
| 6,275,820 B1 | 8/2001 | Navin-Chandra | |
| 6,282,547 B1 | 8/2001 | Hirsch | |
| 6,298,374 B1 | 10/2001 | Sasaki | |
| 6,308,208 B1 | 10/2001 | Jung | |
| 6,311,206 B1 | 10/2001 | Malkin | |
| 6,314,465 B1 | 11/2001 | Paul | |
| 6,329,986 B1 | 12/2001 | Cheng | |
| 6,330,281 B1 | 12/2001 | Mann | |
| 6,334,127 B1 | 12/2001 | Bieganski | |
| 6,334,141 B1 | 12/2001 | Varma | |
| 6,336,134 B1 | 1/2002 | Varma | |
| 6,337,700 B1 | 1/2002 | Kinoe | |
| 6,345,264 B1 | 2/2002 | Breese | |
| 6,345,287 B1 | 2/2002 | Fong | |
| 6,346,938 B1 | 2/2002 | Chan | |
| 6,346,956 B2 | 2/2002 | Matsuda | |
| 6,349,091 B1 | 2/2002 | Li | |
| 6,351,775 B1 | 2/2002 | Yu | |
| 6,353,449 B1 | 3/2002 | Gregg | |
| 6,356,297 B1 | 3/2002 | Cheng | |
| 6,363,174 B1 | 3/2002 | Lu | |
| 6,370,560 B1 | 4/2002 | Robertazzi | |
| 6,388,688 B1 | 5/2002 | Schileru-Key | |
| 6,393,467 B1 | 5/2002 | Potvin | |
| 6,411,312 B1 | 6/2002 | Sheppard | |
| 6,418,424 B1 | 7/2002 | Hoffberg | |
| 6,418,462 B1 | 7/2002 | Xu | |
| 6,426,757 B1 | 7/2002 | Smith | |
| 6,437,777 B1 | 8/2002 | Kamachi | |
| 6,445,389 B1 | 9/2002 | Bossen | |
| 6,452,593 B1 | 9/2002 | Challener | |
| 6,462,760 B1 | 10/2002 | Cox, Jr. | |
| 6,466,213 B2 | 10/2002 | Bickmore | |
| 6,466,550 B1 | 10/2002 | Foster | |
| 6,469,712 B1 | 10/2002 | Hilpert, Jr. | |
| 6,473,085 B1 | 10/2002 | Brock | |
| 6,473,597 B1 | 10/2002 | Johnson | |
| 6,496,851 B1 | 12/2002 | Morris | |
| 6,499,053 B1 | 12/2002 | Marquette | |
| 6,505,208 B1 | 1/2003 | Kanevsky | |
| 6,509,925 B1 | 1/2003 | Dermler | |
| 6,519,571 B1 | 2/2003 | Guhhen | |
| 6,525,731 B1 | 2/2003 | Suits | |
| 6,539,415 B1 | 3/2003 | Mercs | |
| 6,549,933 B1 | 4/2003 | Barrett | |
| 6,567,109 B1 | 5/2003 | Todd | |
| 6,567,813 B1 | 5/2003 | Zhu | |
| 6,570,587 B1 | 5/2003 | Efrat | |
| 6,574,477 B1 | 6/2003 | Rathunde | |
| 6,580,441 B2 | 6/2003 | Schileru-Key | |
| 6,580,981 B1 | 6/2003 | Masood | |
| 6,594,673 B1 | 7/2003 | Smith | |
| 6,601,084 B1 | 7/2003 | Bhaskaran | |
| 6,618,751 B1 | 9/2003 | Challenger | |
| 6,636,889 B1 | 10/2003 | Estrada | |
| 6,645,153 B2 | 11/2003 | Kroll | |
| RE38,375 E | 12/2003 | Herzberg | |
| 6,657,617 B2 | 12/2003 | Paolini | |
| 6,657,642 B1 | 12/2003 | Bardon | |
| 6,672,961 B1 | 1/2004 | Uzun | |
| 6,674,484 B1 | 1/2004 | Boland | |
| 6,684,255 B1 | 1/2004 | Martin | |
| 6,717,600 B2 | 4/2004 | Dutta | |
| 6,732,146 B1 | 5/2004 | Miyake | |
| 6,734,884 B1 | 5/2004 | Berry | |
| 6,742,032 B1 | 5/2004 | Castellani | |
| 6,746,332 B1 | 6/2004 | Ing | |
| 6,753,857 B1 | 6/2004 | Matsuura | |
| 6,763,371 B1 | 7/2004 | Jaendel | |
| 6,765,596 B2 | 7/2004 | Lection | |
| 6,767,287 B1 | 7/2004 | McQuaid | |
| 6,772,195 B1 | 8/2004 | Hatlelid | |
| 6,781,607 B1 | 8/2004 | Benham | |
| 6,784,901 B1 | 8/2004 | Harvey | |
| 6,801,930 B1 | 10/2004 | Dionne | |
| 6,819,669 B2 | 11/2004 | Rooney | |
| 6,826,523 B1 | 11/2004 | Guy | |
| 6,832,239 B1 | 12/2004 | Kraft | |
| 6,836,480 B2 | 12/2004 | Basso | |
| 6,845,389 B1 | 1/2005 | Sen | |
| 6,871,186 B1 | 3/2005 | Tuzhillin | |
| 6,886,026 B1 | 4/2005 | Hanson | |
| 6,941,236 B2 | 9/2005 | Huelsbergen | |
| 6,948,168 B1 | 9/2005 | Kuprionas | |
| RE38,865 E | 11/2005 | Dumarot | |
| 6,970,929 B2 | 11/2005 | Bae | |
| 6,981,223 B2 | 12/2005 | Becker | |
| 6,982,372 B2 | 1/2006 | England | |
| 6,990,381 B2 | 1/2006 | Nomura | |
| 6,993,596 B2 | 1/2006 | Hinton | |
| 7,006,098 B2 | 2/2006 | Bickmore | |
| 7,006,616 B1 | 2/2006 | Christofferson | |
| 7,028,296 B2 | 4/2006 | Irfan | |
| 7,062,533 B2 | 6/2006 | Brown | |
| 7,073,129 B1 | 7/2006 | Robarts | |
| 7,089,266 B2 | 8/2006 | Stolte | |
| 7,091,976 B1 | 8/2006 | Ostermann | |
| 7,115,034 B2 | 10/2006 | Kuwahara | |
| 7,124,071 B2 | 10/2006 | Rich | |
| 7,139,792 B1 | 11/2006 | Mishra | |
| 7,139,984 B2 | 11/2006 | Beaumont | |
| 7,143,409 B2 | 11/2006 | Herrero | |
| 7,146,627 B1 | 12/2006 | Ismail | |
| 7,155,680 B2 | 12/2006 | Akazawa | |
| 7,159,217 B2 | 1/2007 | Pulsipher | |
| 7,185,067 B1 | 2/2007 | Viswanath | |
| 7,209,137 B2 | 4/2007 | Brokenshire | |
| 7,225,256 B2 | 5/2007 | Villavicencio | |
| 7,230,616 B2 | 6/2007 | Taubin | |
| 7,249,123 B2 | 7/2007 | Elder | |
| 7,263,511 B2 | 8/2007 | Bodin | |
| 7,269,632 B2 | 9/2007 | Edecker | |
| 7,287,053 B2 | 10/2007 | Bodin | |
| 7,293,235 B1 | 11/2007 | Powers et al. | 715/706 |
| 7,305,438 B2 | 12/2007 | Christensen | |
| 7,308,476 B2 | 12/2007 | Mannaru | |
| 7,319,992 B2 | 1/2008 | Gaos | |
| 7,353,295 B1 | 4/2008 | Crow | |
| 7,379,066 B1 | 5/2008 | Ostermann | |
| 7,386,799 B1 | 6/2008 | Clanton | |
| 7,396,281 B2 | 7/2008 | Mendelsohn | |
| 7,404,149 B2 | 7/2008 | Fox | |
| 7,426,538 B2 | 9/2008 | Bodin | |
| 7,427,980 B1 | 9/2008 | Partridge | |
| 7,428,588 B2 | 9/2008 | Berstis | |
| 7,429,987 B2 | 9/2008 | Leah | |
| 7,436,407 B2 | 10/2008 | Doi | |
| 7,439,975 B2 | 10/2008 | Hsu | |
| 7,443,393 B2 | 10/2008 | Shen | |
| 7,447,996 B1 | 11/2008 | Cox | |
| 7,467,180 B2 | 12/2008 | Kaufman | |
| 7,467,181 B2 | 12/2008 | McGowan | |
| 7,468,729 B1 | 12/2008 | Levinson | |
| 7,475,354 B2 | 1/2009 | Guido | |
| 7,478,127 B2 | 1/2009 | Creamer | |
| 7,484,012 B2 | 1/2009 | Hinton | |
| 7,503,007 B2 | 3/2009 | Goodman | |
| 7,506,264 B2 | 3/2009 | Polan | |
| 7,515,136 B1 | 4/2009 | Kanevsky | |
| 7,515,156 B2 | 4/2009 | Tinker | |
| 7,517,282 B1 | 4/2009 | Pryor | |
| 7,525,964 B2 | 4/2009 | Astley | |
| 7,552,177 B2 | 6/2009 | Kessen | |
| 7,565,650 B2 | 7/2009 | Bhogal | |

(56) References Cited

U.S. PATENT DOCUMENTS

| | | | |
|---|---|---|---|
| 7,571,224 | B2 | 8/2009 | Childress |
| 7,571,389 | B2 | 8/2009 | Broussard |
| 7,580,888 | B2 | 8/2009 | Ur |
| 7,590,984 | B2 | 9/2009 | Kaufman |
| 7,596,596 | B2 | 9/2009 | Chen |
| 7,636,755 | B2 | 12/2009 | Blattner |
| 7,640,587 | B2 | 12/2009 | Fox |
| 7,643,673 | B2 | 1/2010 | Rohlf |
| 7,667,701 | B2 | 2/2010 | Leah |
| 7,671,861 | B1 | 3/2010 | Ostermann |
| 7,697,668 | B1 | 4/2010 | Ostermann |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D Amora |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,208 | B2 | 11/2010 | Bosworth |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,853,594 | B2 | 12/2010 | Elder |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,000,328 | B1 * | 8/2011 | Kandekar ............... H04L 45/54 370/392 |
| 8,001,161 | B2 | 8/2011 | Finn |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |
| 8,026,913 | B2 | 9/2011 | Garbow |
| 8,026,918 | B1 * | 9/2011 | Murphy ............... G06N 3/006 345/473 |
| 8,028,021 | B2 | 9/2011 | Reisinger |
| 8,028,022 | B2 | 9/2011 | Brownholtz |
| 8,037,416 | B2 | 10/2011 | Bates |
| 8,041,614 | B2 | 10/2011 | Bhogal |
| 8,047,915 | B2 | 11/2011 | Lyle |
| 8,051,462 | B2 | 11/2011 | Hamilton, II |
| 8,055,656 | B2 | 11/2011 | Cradick |
| 8,056,121 | B2 | 11/2011 | Hamilton, II |
| 8,057,307 | B2 | 11/2011 | Berstis |
| 8,062,130 | B2 | 11/2011 | Smith |
| 8,063,905 | B2 | 11/2011 | Brown |
| 8,070,601 | B2 | 12/2011 | Acharya |
| 8,082,245 | B2 | 12/2011 | Bates |
| 8,085,267 | B2 | 12/2011 | Brown |
| 8,089,481 | B2 | 1/2012 | Shearer |
| 8,092,288 | B2 | 1/2012 | Theis |
| 8,095,881 | B2 | 1/2012 | Reisinger |
| 8,099,338 | B2 | 1/2012 | Betzler |
| 8,099,668 | B2 | 1/2012 | Garbow |
| 8,102,334 | B2 | 1/2012 | Brown |
| 8,103,640 | B2 | 1/2012 | Lo |
| 8,103,959 | B2 | 1/2012 | Cannon |
| 8,105,165 | B2 | 1/2012 | Karstens |
| 8,108,774 | B2 | 1/2012 | Finn |
| 8,113,959 | B2 | 2/2012 | De Judicibus |
| 8,117,551 | B2 | 2/2012 | Cheng |
| 8,125,485 | B2 | 2/2012 | Brown |
| 8,127,235 | B2 | 2/2012 | Haggar |
| 8,127,236 | B2 | 2/2012 | Hamilton, II |
| 8,128,487 | B2 | 3/2012 | Hamilton, II |
| 8,131,740 | B2 | 3/2012 | Cradick |
| 8,132,235 | B2 | 3/2012 | Bussani |
| 8,134,560 | B2 | 3/2012 | Bates |
| 8,139,060 | B2 | 3/2012 | Brown |
| 8,139,780 | B2 | 3/2012 | Shearer |
| 8,140,340 | B2 | 3/2012 | Bhogal |
| 8,140,620 | B2 | 3/2012 | Creamer |
| 8,140,978 | B2 | 3/2012 | Betzler |
| 8,140,982 | B2 | 3/2012 | Hamilton, II |
| 8,145,676 | B2 | 3/2012 | Bhogal |
| 8,145,725 | B2 | 3/2012 | Dawson |
| 8,149,241 | B2 | 4/2012 | Do |
| 8,150,941 | B2 | 4/2012 | Edecker |
| 8,151,191 | B2 | 4/2012 | Nicol, II |
| 8,156,184 | B2 | 4/2012 | Kurata |
| 8,165,350 | B2 | 4/2012 | Fuhrmann |
| 8,171,407 | B2 | 5/2012 | Huang |
| 8,171,408 | B2 | 5/2012 | Dawson |
| 8,171,559 | B2 | 5/2012 | Hamilton, II |
| 8,174,541 | B2 | 5/2012 | Greene |
| 8,176,421 | B2 | 5/2012 | Dawson |
| 8,176,422 | B2 | 5/2012 | Bergman |
| 8,184,092 | B2 | 5/2012 | Cox |
| 8,184,116 | B2 | 5/2012 | Finn |
| 8,185,450 | B2 | 5/2012 | McVey |
| 8,185,829 | B2 | 5/2012 | Cannon |
| 8,187,067 | B2 | 5/2012 | Hamilton, II |
| 8,199,145 | B2 | 6/2012 | Hamilton, II |
| 8,203,561 | B2 | 6/2012 | Carter |
| 8,214,335 | B2 | 7/2012 | Hamilton, II |
| 8,214,433 | B2 | 7/2012 | Dawson |
| 8,214,750 | B2 | 7/2012 | Hamilton, II |
| 8,214,751 | B2 | 7/2012 | Dawson |
| 8,217,953 | B2 | 7/2012 | Comparan |
| 8,219,616 | B2 | 7/2012 | Dawson |
| 8,230,045 | B2 | 7/2012 | Kawachiya |
| 8,230,338 | B2 | 7/2012 | Dugan |
| 8,233,005 | B2 | 7/2012 | Finn |
| 8,234,234 | B2 | 7/2012 | Shearer |
| 8,234,579 | B2 | 7/2012 | Do |
| 8,239,775 | B2 | 8/2012 | Beverland |
| 8,241,131 | B2 | 8/2012 | Bhogal |
| 8,245,241 | B2 | 8/2012 | Hamilton, II |
| 8,245,283 | B2 | 8/2012 | Dawson |
| 8,265,253 | B2 | 9/2012 | D Amora |
| 8,310,497 | B2 | 11/2012 | Comparan |
| 8,334,871 | B2 | 12/2012 | Hamilton, II |
| 8,360,886 | B2 | 1/2013 | Karstens |
| 8,364,804 | B2 | 1/2013 | Childress |
| 8,425,326 | B2 | 4/2013 | Chudley |
| 8,442,946 | B2 | 5/2013 | Hamilton, II |
| 8,506,372 | B2 | 8/2013 | Chudley |
| 8,514,249 | B2 | 8/2013 | Hamilton, II |
| 8,554,841 | B2 | 10/2013 | Kurata |

(56) References Cited

U.S. PATENT DOCUMENTS

| | | |
|---|---|---|
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,713,450 B2 | 4/2014 | Garbow |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2001/0055039 A1 | 12/2001 | Matsuda |
| 2002/0007317 A1 | 1/2002 | Callaghan |
| 2002/0010776 A1 | 1/2002 | Lerner |
| 2002/0023159 A1 | 2/2002 | Vange |
| 2002/0026477 A1 | 2/2002 | Choi |
| 2002/0035593 A1 | 3/2002 | Salim |
| 2002/0041327 A1 | 4/2002 | Hildreth |
| 2002/0043568 A1 | 4/2002 | Hess |
| 2002/0056006 A1 | 5/2002 | Vange |
| 2002/0065870 A1 | 5/2002 | Baehr-Jones |
| 2002/0078192 A1 | 6/2002 | Kopsell |
| 2002/0095586 A1 | 7/2002 | Doyle |
| 2002/0107918 A1 | 8/2002 | Shaffer |
| 2002/0109719 A1 | 8/2002 | Hata |
| 2002/0112002 A1 | 8/2002 | Abato |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0138588 A1* | 9/2002 | Leeds ............... H04L 12/1831 709/217 |
| 2002/0138607 A1 | 9/2002 | O |
| 2002/0152147 A1 | 10/2002 | Shulman |
| 2002/0158873 A1 | 10/2002 | Williamson |
| 2002/0184373 A1 | 12/2002 | Maes |
| 2002/0198940 A1 | 12/2002 | Bower |
| 2003/0008712 A1 | 1/2003 | Poulin |
| 2003/0037131 A1 | 2/2003 | Verma |
| 2003/0040946 A1 | 2/2003 | Sprenger |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0067554 A1 | 4/2003 | Klarfeld |
| 2003/0084094 A1 | 5/2003 | Shim |
| 2003/0084172 A1 | 5/2003 | Dejong |
| 2003/0084302 A1 | 5/2003 | De |
| 2003/0110399 A1 | 6/2003 | Rail |
| 2003/0119531 A1 | 6/2003 | Patton |
| 2003/0122858 A1 | 7/2003 | Mauve |
| 2003/0126318 A1 | 7/2003 | Nomura |
| 2003/0135621 A1 | 7/2003 | Romagnoli |
| 2003/0145128 A1 | 7/2003 | Baird |
| 2003/0149781 A1 | 8/2003 | Yared |
| 2003/0156134 A1 | 8/2003 | Kim ............... 345/753 |
| 2003/0163733 A1 | 8/2003 | Barriga-Caceres |
| 2003/0172174 A1 | 9/2003 | Mihalcheon |
| 2003/0177187 A1 | 9/2003 | Levine |
| 2003/0187984 A1 | 10/2003 | Banavar |
| 2003/0190951 A1 | 10/2003 | Matsumoto |
| 2003/0195957 A1 | 10/2003 | Banginwar |
| 2003/0212760 A1 | 11/2003 | Chen |
| 2003/0220980 A1 | 11/2003 | Crane |
| 2004/0002380 A1 | 1/2004 | Brosnan |
| 2004/0014514 A1 | 1/2004 | Yacenda |
| 2004/0034831 A1 | 2/2004 | Grober |
| 2004/0059436 A1 | 3/2004 | Anderson |
| 2004/0077394 A1 | 4/2004 | Matsuno |
| 2004/0088303 A1 | 5/2004 | Elder |
| 2004/0103079 A1 | 5/2004 | Tokusho |
| 2004/0111479 A1 | 6/2004 | Borden |
| 2004/0113756 A1 | 6/2004 | Mollenkopf |
| 2004/0130549 A1 | 7/2004 | Tinker |
| 2004/0153514 A1 | 8/2004 | Crane |
| 2004/0193441 A1 | 9/2004 | Altieri |
| 2004/0210627 A1 | 10/2004 | Kroening |
| 2004/0228291 A1 | 11/2004 | Huslak |
| 2004/0244006 A1 | 12/2004 | Kaufman |
| 2004/0252123 A1 | 12/2004 | Estrada |
| 2004/0261037 A1 | 12/2004 | Ording |
| 2005/0015571 A1 | 1/2005 | Kaufman |
| 2005/0021484 A1 | 1/2005 | Bodin |
| 2005/0022139 A1 | 1/2005 | Gettman |
| 2005/0050137 A1 | 3/2005 | Bodin |
| 2005/0071462 A1 | 3/2005 | Bodin |
| 2005/0210413 A1 | 9/2005 | Quek |
| 2005/0216346 A1 | 9/2005 | Kusumoto |
| 2005/0246711 A1 | 11/2005 | Berstis |
| 2005/0278323 A1 | 12/2005 | Horvitz |
| 2006/0010229 A1 | 1/2006 | Chen |
| 2006/0026233 A1 | 2/2006 | Tenembaum |
| 2006/0041663 A1* | 2/2006 | Brown ............... G06F 17/30867 709/226 |
| 2006/0045082 A1 | 3/2006 | Fertell |
| 2006/0080613 A1 | 4/2006 | Savant |
| 2006/0085759 A1 | 4/2006 | Knapheide |
| 2006/0094501 A1 | 5/2006 | Oleary |
| 2006/0123351 A1 | 6/2006 | Littlefield |
| 2006/0136395 A1 | 6/2006 | Rhee |
| 2006/0178967 A1 | 8/2006 | Jung |
| 2006/0210045 A1 | 9/2006 | Valliath |
| 2006/0212900 A1 | 9/2006 | Ismail |
| 2006/0212925 A1 | 9/2006 | Shull |
| 2006/0235791 A1 | 10/2006 | Jung |
| 2006/0253784 A1 | 11/2006 | Bower |
| 2006/0284792 A1 | 12/2006 | Foxlin |
| 2007/0035548 A1 | 2/2007 | Jung |
| 2007/0035549 A1 | 2/2007 | Jung |
| 2007/0050214 A1 | 3/2007 | Hawks |
| 2007/0050721 A1 | 3/2007 | De |
| 2007/0063999 A1 | 3/2007 | Park |
| 2007/0087756 A1 | 4/2007 | Hoffberg |
| 2007/0106526 A1 | 5/2007 | Jung |
| 2007/0118420 A1 | 5/2007 | Jung |
| 2007/0130001 A1 | 6/2007 | Jung |
| 2007/0156664 A1 | 7/2007 | Norton et al. ............ 707/3 |
| 2007/0218965 A1 | 9/2007 | Tilston |
| 2007/0240119 A1 | 10/2007 | Ducheneaut |
| 2008/0005319 A1 | 1/2008 | Anderholm |
| 2008/0026847 A1 | 1/2008 | Mueller |
| 2008/0045245 A1* | 2/2008 | Billmaier ............... H04W 4/02 455/457 |
| 2008/0059198 A1 | 3/2008 | Maislos |
| 2008/0070684 A1 | 3/2008 | Haigh-Hutchinson |
| 2008/0086696 A1 | 4/2008 | Sri |
| 2008/0104495 A1 | 5/2008 | Craig |
| 2008/0134056 A1 | 6/2008 | Shuster |
| 2008/0162202 A1 | 7/2008 | Khanna |
| 2008/0207327 A1 | 8/2008 | Van |
| 2008/0215994 A1 | 9/2008 | Harrison et al. ............ 715/757 |
| 2008/0263446 A1* | 10/2008 | Altberg ............... G06Q 30/02 715/706 |
| 2008/0263459 A1 | 10/2008 | Altberg |
| 2008/0263460 A1 | 10/2008 | Altberg |
| 2008/0270605 A1 | 10/2008 | Berstis |
| 2008/0291217 A1 | 11/2008 | Vincent |
| 2008/0301405 A1 | 12/2008 | Kaufman |
| 2008/0307066 A1 | 12/2008 | Amidon et al. ............ 709/217 |
| 2009/0013052 A1 | 1/2009 | Robarts |
| 2009/0037822 A1 | 2/2009 | Kandekar et al. ............ 715/733 |
| 2009/0049513 A1 | 2/2009 | Root |

(56) References Cited

U.S. PATENT DOCUMENTS

| | | | |
|---|---|---|---|
| 2009/0055484 A1 | 2/2009 | Vuong et al. | 709/206 |
| 2009/0064052 A1 | 3/2009 | Mihalcheon | |
| 2009/0079816 A1 | 3/2009 | Qvarfordt | |
| 2009/0094535 A1 | 4/2009 | Bromenshenkel | |
| 2009/0113314 A1 | 4/2009 | Dawson | |
| 2009/0113319 A1 | 4/2009 | Dawson | |
| 2009/0113448 A1 | 4/2009 | Smith | |
| 2009/0113554 A1 | 4/2009 | Zalewski | |
| 2009/0132689 A1 | 5/2009 | Zaltzman | |
| 2009/0138335 A1 | 5/2009 | Lieberman | |
| 2009/0158151 A1 | 6/2009 | Cheng et al. | 715/706 |
| 2009/0164458 A1 | 6/2009 | Jung et al. | 707/5 |
| 2009/0164919 A1 | 6/2009 | Bates | |
| 2009/0165140 A1 | 6/2009 | Robinson | |
| 2009/0177979 A1 | 7/2009 | Garbow | |
| 2009/0222276 A1 | 9/2009 | Romney | |
| 2009/0267938 A1 | 10/2009 | Nicol | |
| 2009/0276718 A1 | 11/2009 | Dawson | |
| 2010/0011312 A1 | 1/2010 | Banerjee | |
| 2010/0211638 A1 | 8/2010 | Rougier | 709/205 |
| 2011/0279461 A1 | 11/2011 | Hamilton et al. | 345/473 |
| 2014/0344725 A1 | 11/2014 | Bates | |
| 2016/0191671 A1 | 6/2016 | Dawson | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0940960 A1 | 9/1999 |
| EP | 0998091 A2 | 5/2000 |
| EP | 1020804 A2 | 7/2000 |
| EP | 0627728 B1 | 9/2000 |
| EP | 1089516 A2 | 4/2001 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 1852829 A1 | 11/2007 |
| EP | 2076888 B1 | 7/2015 |
| GB | 2339938 | 10/2002 |
| GB | 2352154 | 7/2003 |
| JP | H0759945 A | 3/1995 |
| JP | H07254072 A | 10/1995 |
| JP | H1198134 A | 4/1999 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 9504331 A1 | 2/1995 |
| WO | 9642041 A2 | 12/1996 |
| WO | 9900960 A1 | 1/1999 |
| WO | 0137162 A2 | 5/2001 |
| WO | 2001050387 | 12/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Office Action History of U.S. Appl. No. 11/962,841, dated Feb. 7, 2011-Jun. 8, 2011.
["What Are Virtual Environments"],IEEE Computer Graphics & Applications, Stephen R. Ellis, Jan. 1994.
["Synchronous Writing Environment : Real-time interaction in cyberspace"], Journal of Adolescent & Adult Literacy, Oct. 1996.
WI. Clement, "An Instructional robotics and machine Vision Laboratory," IEEE Transactions on Education, pp. 87-90, 1994.
http://www.news.com.SpecialFeatrues/Continued/0,6,4804 4,00. html, "Billboards on the Infobahn," pp. 1-2, May 23, 1997.
Kohda, Youji, et al., Ubiquitous advertising on the WWW. Merging advertisement on the browser, Computer Networks and IDSN Systems, 28, pp. 1493-1499 (1996).
Jacobson, J., "Collision avoidance in virtual environments," 1997 IEEE Int. Conf. on SMC pp. 1704-1709.
Kormann et al., "Risks of the Passport Single Signon Protocol" < 9th Intl. WWW Conf., May 15, 2000.
Syverson, "Limitations on design principles for public key protocols", Proc. of 1996 IEEE Symposium on Security and Privacy, pp. 62-72, May 6, 1996.
Abadi et al., "Prudent Engineering Practice for Cryptogrphic Protocols", Proc. of 1994 IEEE Computer Society Symposium on Research in Security and Privacy, pp. 122-136, May 16, 1994.

(56) References Cited

OTHER PUBLICATIONS

Kautz, H., B. Selman, M. Shah.. "Referral Web: Combining Social Networks and Collaborative Filtering". Communications of the ACM, vol. 40, No. 3, Mar. 1997.
Schwartz, M. F., D. C. M. Wood. "Discovering shared interests among people using graph analysis of global electronic mail traffic". Department of Computer Science, University of Colorado, Boulder CO. Oct. 1992.
Wellman, B. "For a social network analysis of computer networks: a sociological perspective on collaborative work and virtual community". Proceedings of the 1996 conference on ACM SIGCPR/SIGMIS. 1-11.
Qureshi, S. "Supporting electronic group processes: a social perspective". Proceedings of the 1995 ACM SIGCPR Conference on Supporting teams, groups, and learning inside the IS function. ACM Press. 24-34.
Ackerman, M.S., B. Starr. "Social activity indicators: interface components for CSCW systems". Proceedings of the 8th ACM Symposium on User Interface and Software Technology. ACM Press. 159-168, Nov. 14-17, 1995.
Garton, L., C. Haythornthwaite, B. Wellman. "Studying on-line social networks in Doing Internet Research", Jun. 1997.
Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for ACK SIGKDD 1999. ACM Press. 182-236.
Supplementary European Search from the European Patent Office for EP05723458.5, dated Jul. 19, 2010.
International Search Report as Published as WO2005/079538 in corresponding international application No. PCT/US2005/005550, dated Jul. 5, 2006.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.
Ma et al., "A Scalable Parallel Cell-Projection Volume Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97", IEEE Computer Society Technical Committee on Computer Graphics in cooperation with ACM SIGGRAPH pp. 71-79, 1997.
Hassen et al., "A Task-and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
Jim X. Chen, Yonggao Yang, and Bowen Loftin, 2003, "MUVEES: a PC-based Multi-User Virtual Environment for Learning", Proceedings of the IEEE Virtual Reality 2003 (VR '03), IEEE Computer Society, Washington, DC, USA, pp. 163-170.
Fernando, et al., "Cloning and teleporting avatars across workstations and mobile devices in collaborative virtual environments: Clipboard operations for virtual reality", Proceedings ICIA'05: Int. Conf. on Information and Automation, Colombo, Sri Lanka, Dec. 15-18, 2005, pp. 133-140.
Anonymous; Window (computing); Download date: Jun. 3, 2007; Wikipedia; http://en.wikipedia.org/wiki/Window.sub.--(computing).
A. Newitz, "Your Second Life is ready," Popular Science, Oct. 2006, 4 pages: http://www.popsci.com/popsci/technology/7balaf8f3812d010vgnvcm1000-004eecbccdrcrd.html.
Judson et al., "Virtual Venue Management Users Guide", Argonne National Laboratory, Mathematics and Computer Science Division, Technical Memorandum No. 287, Feb. 2006, 19 pages, downloaded from: http://scholar.google.com/scholar?cluster=14486023041208461039&hl=en&as.s- ub.--sdt=80000000000000.
Stardock.com; The User Guide—Version 2; DesktopX, 2000; 52 pages.
Wang; SmartCU3D: a collaborative virtual environment system with behavior based interaction management; Proceedings of the ACM Symposium on Virtual Reality Software and Tech; VRST '01, Nov. 15-17, 2001, pp. 25-32.
Celentano; Adaptive interaction in Web3D virtual worlds; Proceedings of the Ninth International Conference on 3D Web Technology; Apr. 2004; pp. 41-50.
Chittaro; Dynamic generation of personalized VRML content; Proceedings of the Seventh International Conference on 3D Web Technology; Feb. 2002; pp. 145-154.
Elvins, T. T., Nadeau, D. R., Schul, R., and Kirsh, D., "Worldlets: 3D thumbnails for 3D browsing", Proceedings of the SIGCHI Conference on Human Factors in Computing Systems, Apr. 18-23, 1998, Conference on Human Factors in Computing Systems. ACM Press/Addison-Wesley Publishing Co., New York, NY, 163-170.
Elvins; Worldlets-3D Thumbnails for Wayfinding in virtual environments;Proceedings of the 10th Annual ACM Symposium on User Interface Software and; Oct. 1997; pp. 21-30.
Elvins, T.T., et al; Wordlets: 3D thumbnails for 3D browsing; Proceedings of the SIGCHI Conference on Human Factors in Computing systems; Apr. 18-23, 1998; ACM Press/Addison-Wesley Publishing Co., NY, NY; pp. 163-170.
Amund Tveit; Customizing Cyberspace: Methods for User Representation and Prediction; Thesis, Department of Computer Science, Norwegian University of Science and Technology; Trondheim, Norway; Jul. 1, 2004; 187 pages.
Grammenos, D., Filou, M., Papadakos, P., and Stephanidis, C., "Virtual Prints: leaving trails in virtual environments", Proceedings of the Workshop on Virtual Environments 2002, May 30-31, 2002, W. Sturzlinger and S. Muller, Eds., ACM International Conference Proceeding Series, vol. 23. Eurographics Association, pp. 131-138, 222.
Stardock.com et al., "The User Guide-Version 2", DesktopX, 2000, 57 pages.
Elvins, T. T., Nadeau, D. R., and Kirsh, D. 1997. Worldlets-3D thumbnails for wayfinding in virtual environments. In Proceedings of the 10th Annual ACM Symposium on User interface Software and Technology (Banff, Alberta, Canada, Oct. 14-17, 1997). UIST '97. ACM, New York, NY, 21-30.
Wang, W., Lin, Q., Ng, J. M., and Low, C. P. 2001. SmartCU3D: a collaborative virtual environment system with behavior based interaction management. In Proceedings of the ACM Symposium on Virtual Reality Software and Technology (Baniff, Alberta, Canada, Nov. 15-17, 2001). VRST '01. ACM, New York, NY, 25-32.

(56) References Cited

OTHER PUBLICATIONS

PCT Notification of Transmittal of the International Search Report and the Written Opinion of the International Searching Authority, or the Declaration dated Mar. 23, 2009.

Bares, William H., et al., "Habitable 3D Learning Environments for Situated Learning", ITS-98: Proceedings of the Fourth International Conference on Intelligent Tutoring Systems, San Antonio, Texas, (1998),76-85.

Bares, William H., "Realtime Generation of Customized 3D Animated Explanations for Knowledge-Based Learning Environments", AAAI-97: Proceedings of the Fourteenth National Conference on Artificial Intelligence, Providence, Rhode Island, (1997),347-354.

Hayes, Gary, "Virtual Worlds, Web 3.0 and Portable Profiles", Personalize Media, http;//www.personalizemedia.com/virtual-worlds-wab-30-and-portable-profiles, Aug. 27, 2006, pp. 1-13.

Aquino etal., "Multi-Agent Architecture for Generating and Monitoring Adaptive Virtual Environments", Proceedings of the Fifth International Conference on Hybrid Intelliqent Systems (HIS'05), 0-7695-2457, IEEE—Computer Society, 2005, 3 pages.

\* cited by examiner

GENERATING DATA FOR MANAGING ENCOUNTERS IN A VIRTUAL WORLD ENVIRONMENT

CROSS-REFERENCE TO RELATED APPLICATIONS

This application is continuation of U.S. patent application Ser. No. 11/963,883, filed Dec. 24, 2007 (status: pending), which is hereby incorporated by reference herein in its entirety.

BACKGROUND OF THE INVENTION

Field of the Invention

Embodiments of the invention relate to the use of immersive virtual environments. More specifically, embodiments of the invention relate to avoiding specific users of an immersive virtual environment.

Description of the Related Art

A virtual world is a simulated environment which users may inhabit and in which the users may interact with virtual objects and locations of the virtual world. Users may also interact with one another via avatars. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, real-time voice communication, gestures displayed by avatars, symbols visible in the virtual world, and the like.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

SUMMARY OF THE INVENTION

One embodiment of the invention includes a computer-implemented method. The method generally includes: receiving, from a first user, a selection indicating a preference of the first user towards encountering the second user while present in a virtual world; determining a current situational context for the first user within the virtual world; and storing the selection of the second user together with the current situational context in a searchable data structure.

Another embodiment of the invention includes a computer-readable storage medium including a program, which when executed on a processor performs an operation. The operation may generally include: receiving, from a first user, a selection indicating a preference of the first user towards encountering the second user while present in a virtual world; determining a current situational context for the first user within the virtual world; and storing the selection of the second user together with the current situational context in a searchable data structure.

Still another embodiment of the invention includes a system having a processor and a memory. The memory may store a program, which when executed by the processor, is configured to perform the steps of: receiving, from a first user, a selection indicating a preference of the first user towards encountering the second user while present in a virtual world; determining a current situational context for the first user within the virtual world; and storing the selection of the second user together with the current situational context in a searchable data structure.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
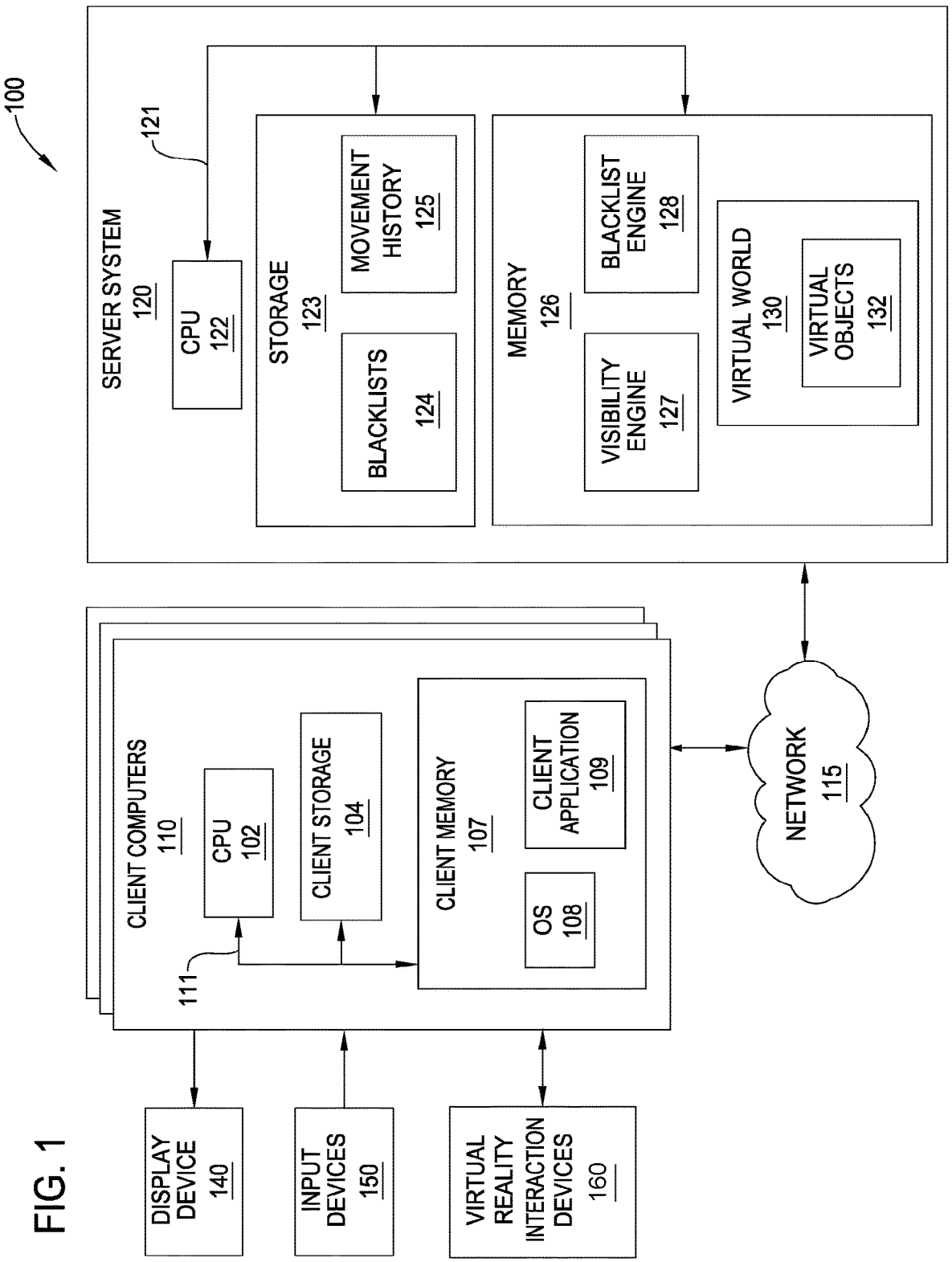
FIG. 1 is a block diagram that illustrates a client server view of computing environment, according to one embodiment of the invention.

A virtual world is a simulated environment in which users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach another avatar, and may interact with the other avatar by communicating, performing financial transactions, and the like. Thus, multiple users, although in different physical locations, may be present in the same virtual location, and may interact therein by using their respective avatars.

However, in some situations, a first user may wish to avoid other users within the virtual world. For example, in a situation where the first user is participating in a professional activity (e.g., a virtual business meeting), he may wish to avoid casual friends who may behave unprofessionally, and thus cause embarrassment. In another example, the first user may have gone through a divorce, and may wish to go on a date in the virtual world without running into the former spouse.

Embodiments of the invention provide techniques for providing information for avoiding specific users of an immersive virtual environment. In one embodiment, a primary user may specify other users to be avoided in a blacklist. The blacklisted users may be specified to be avoided at all times, or may be specified to be avoided in certain situations. In one embodiment, a user may be added to the blacklist during a specific situation, resulting in the characteristics of the situation being automatically stored in the blacklist. Subsequently, the blacklist may be used to determine the locations of the blacklisted users matching the current situation. The primary user may then avoid the locations having the greatest probability of encountering blacklisted users.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115. Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to a virtual world 130 on the server 120, and once connected, to perform various user actions. Such actions may include exploring virtual locations, interacting with other avatars, and interacting with virtual objects. Further, the client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to the virtual world 130. Such a display may include content from the virtual world determined from the user's line of sight at any given time. For the user, the display may present a third-person perspective, meaning a view from a location other than that of the user's avatar, and which may include the image of the user's avatar within the virtual world. Alternatively, the display may present a first-person perspective, meaning a view of the virtual world as would be seen through the eyes of the avatar representing the user.

Figure 2:
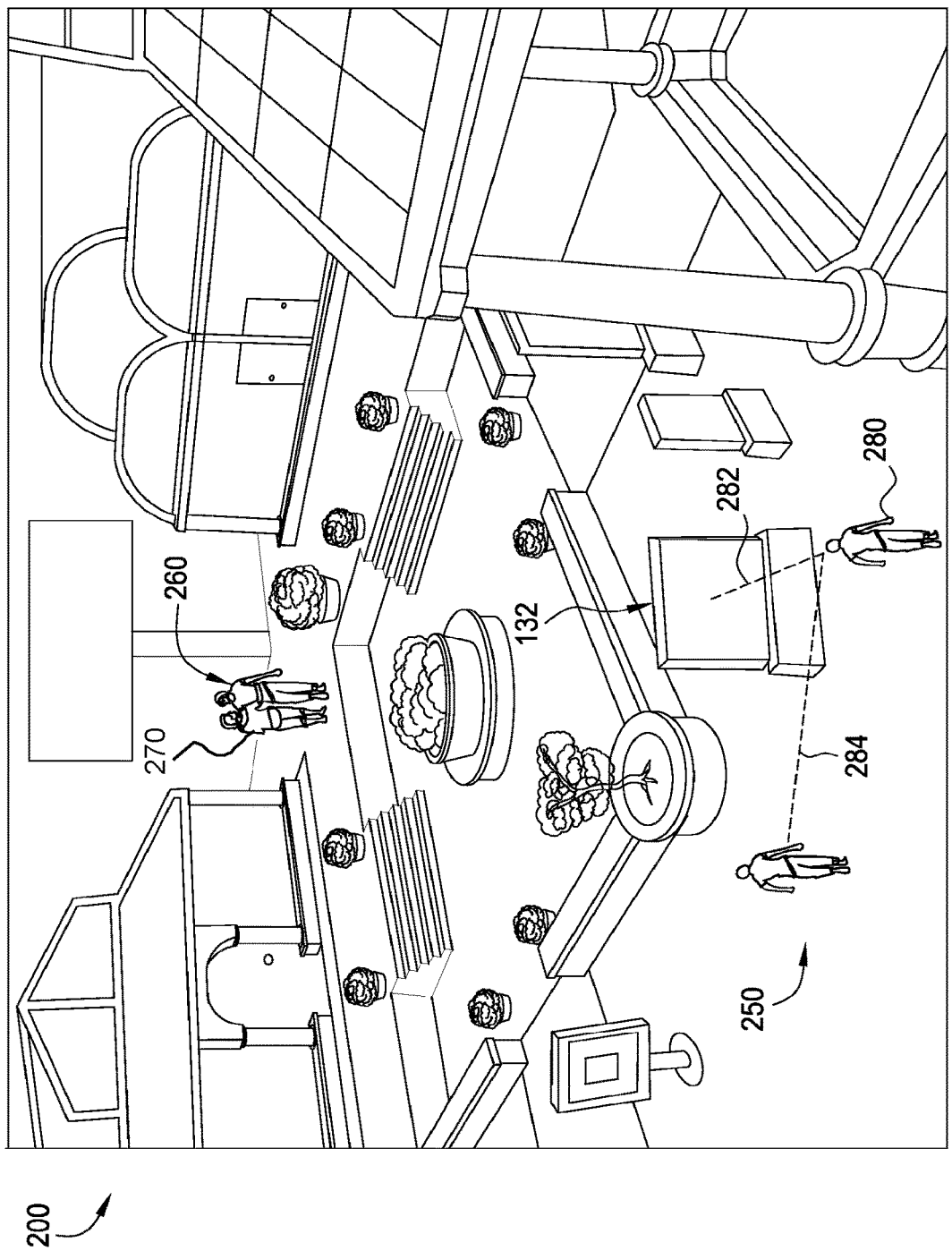
FIG. 2 illustrates a user display for a user participating in a virtual world, according to one embodiment of the invention.

By way of example, FIG. 2 illustrates a user display 200 showing a third-person view presented to a user participating in a virtual world, according to one embodiment of the invention. In this example, the primary user (i.e., the user viewing the user display 200) is represented by avatar 270, and is present in a virtual town square. The primary user may interact with elements of the virtual world, including objects, locations, and other users. For example, as illustrated in FIG. 2, the avatar 270 is interacting with an avatar 260 of a second user, thus enabling the primary user to communicate with the second user.

In some situations, the primary user may wish to avoid contact with a third user, illustrated by avatar 280. For example, the primary user may be using avatar 270 to conduct a business negotiation with avatar 260, and may wish to avoid a casual friend represented by avatar 280. However, as in the situation illustrated in FIG. 2, being present in the same virtual location may result in avatar 270 having an unwanted encounter with avatar 280. More specifically, in the event that avatar 270 comes into a line of sight of the user of avatar 280, an unwanted encounter may occur.

In one embodiment, the line of sight of a user will depend on the type of view of the virtual world being used by that user. That is, if the user of avatar 280 is viewing a first-person perspective of the virtual world (i.e., seeing through the avatar's eyes), he may be able to see a fourth avatar 250, since he has an unobstructed line of sight 284 (shown as a dotted line) to the fourth avatar 250. In contrast, the user of avatar 280 may not be able to see the avatar 270, since a second line of sight 282 to avatar 270 may be obstructed by the virtual objects 132. Further, in the situation that the user of avatar 280 is viewing a third-person view of the virtual world (i.e., similar to user display 200 shown in FIG. 2), his perspective may be that of a "camera eye" floating over the scene, and would thus allow him to see the avatar 270 over and/or around the virtual objects 132. In one embodiment, the line of sight of a user may also depend on the distance between the user's avatar and another avatar. That is, the virtual world 130 may include predefined limits on distances at which two avatars may view each other.

Returning to FIG. 1, the user may view the virtual world using a display device 140, such as an LCD or CRT monitor display, and interact with the client application 109 using input devices 150. Further, in one embodiment, the user may interact with the client application 109 and the virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

As shown, the server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. The server system 120 may be operably connected to the network 115, which generally represents any kind of data communications network. Accordingly, the network 115 may represent both local and wide area networks, including the Internet.

In one embodiment, storage 123 may include a set of blacklists 124 and a movement history 125. The movement history 125 may store data describing past locations and movements of avatars within the virtual world 130. Each blacklist 124 may be a data structure corresponding to a given user (hereafter referred to as the primary user), and may be configured to store characteristics of other users (hereafter referred to as blacklisted users) that the primary user may wish to avoid. That is, the blacklist 124 may describe the primary user's preferences with regards to avoiding contact with the blacklisted users while present in the virtual world. A method for adding a user to the blacklist 124 is described below with reference to FIG. 3. Generally, the blacklist 124 may represent any data structure suited to the current application, such as a database table, XML document, flat file, and the like.

In one embodiment, the characteristics stored in the blacklist 124 may include an identifier and an avoidance level assigned to each blacklisted user. The avoidance level may indicate a degree to which the primary user wishes to avoid the blacklisted user having the avoidance level. For example, in a situation where the primary user must come into contact with either of two blacklisted users, the primary user will usually choose to come into contact with the user having a lower avoidance level.

In one embodiment, the blacklist 124 may describe a user as being on an absolute (unconditional) blacklist, meaning that the primary user wishes to avoid any contact with the blacklisted user in all circumstances. Alternatively, the blacklist 124 may describe a user as being on a situational (conditional) blacklist, meaning the primary user wishes to avoid contact with the blacklisted user only in defined situations. A situational blacklist may be defined in terms of characteristics of the primary user's situation, such as a location (e.g., avoid at my office, avoid in public spaces, etc.), companions (e.g., avoid when I am with my boss, avoid when I am with clients, etc.), or time frame (e.g., avoid from 8 AM to 4 PM each day). Further, a situational blacklist may also be defined in terms of the primary user's current profile, meaning a general description of the primary user's intended activity or mode of interacting while in the virtual world. For example, a situational blacklist may specify that a blacklisted user is to be avoided while the primary user is in a "Work" profile (i.e., the primary user is conducting business affairs). Furthermore, a situational blacklist may be defined in terms of the primary user's current activity (e.g., avoid while I am working, avoid while I am talking, etc.).

In one embodiment, the characteristics stored in the blacklist 124 may be defined in terms of groups of users of the virtual world. That is, the blacklist 124 may include defined groups of users to avoid, either conditionally or unconditionally. For example, the blacklist 124 may specify that the group "Competitors" should always be avoided at all times, and that the group "Friends" should be avoided when the primary user is using a "Work" profile, or is at an office location. Further, the blacklist 124 may specify a group to avoid when the primary user is in the company of another person or group (e.g., avoid the group "Friends" when I am in the company of the group "Business Clients"). Furthermore, the blacklist 124 may specify a user to avoid when that user is in the company of another person or group (e.g., avoid user "John" when he is in the company of user "Jane").

As shown, memory 126 includes a virtual world 130, a visibility engine 127 and a blacklist engine 128. In one embodiment, the virtual world 130 may be a software application that allows a user to explore and interact with an immersive environment. As described, the user may access the virtual world 130 by using the client application 109, according to one embodiment. The virtual world 130 may include virtual objects 132, such as buildings, trees, houses, etc.

The blacklist engine 128 may be a software application configured to enable a primary user to create and modify a blacklist 124. Additionally, the blacklist engine 128 may be configured to determine situations in which the primary user may encounter a blacklisted user, and to assist the primary user in avoiding such encounters.

In one embodiment, the primary user may use the blacklist engine 128 to manually add users to the blacklist 124. For example, the primary user may interact with a user interface provided by the blacklist engine 128 in order to specify an identifier for the user being blacklisted (e.g., user name, user alias, etc.), the type of blacklist (i.e., absolute or situational), a user group (e.g., "Friends," "Clients," etc.), a situational context (e.g., at work, with clients, etc.), and the like.

In one embodiment, the primary user may use the blacklist engine 128 to select users to be added to the blacklist 124 by tagging them during an encounter within the virtual world. The selection of a user for blacklisting may be accompanied by automatically capturing the current situational context. Accordingly, the selected user may be put on a situational blacklist, without requiring the primary user to manually define the situational context of the blacklist (e.g., location, time frame, user profile, etc.). Further, prior to adding the selected user to the blacklist 124, the primary user may be allowed to review and modify the blacklist specification, according to one embodiment. For example, the primary user may interact with an interface provided by the blacklist engine 128 in order to review and modify the characteristics to be stored in the blacklist 124.

In one embodiment, the blacklist engine 128 may be further configured to assist the primary user in avoiding encounters with blacklisted users. More specifically, the blacklist engine 128 may be configured to evaluate the blacklist 124 in order to determine situations (i.e., locations, times, activities, groups, etc.) in which the primary user will be likely to encounter a blacklisted user, and to alert the primary user so as to avoid those situations. In one embodiment, the blacklist engine 128 may be configured to determine the current locations of blacklisted users within the virtual world 130. Further, the blacklist engine 128 may use the movement history 125 to analyze previous movements of the blacklisted users in order to predict probabilities that they will be present at given locations at given times. That is, certain characteristics of a user's past movements (e.g., movement patterns, frequencies, times, etc.) may be analyzed using statistical and/or probabilistic analysis to generate predictions of future movements. In one embodiment, the predicted probabilities may be analyzed using the primary user's travel plans within the virtual world 130, in order to determine the likelihood of the primary user encountering blacklisted users. This analysis may include consideration of situational blacklists. That is, whether a potential encounter will take place under any situational characteristics (i.e., location, time, profile, group, etc.) that may be assigned to the blacklisted user in the blacklist 124.

In one embodiment, the blacklist engine 128 may interact with the visibility engine 127 in order to consider lines of sight in predicting a probability of encountering a blacklisted user. The visibility engine 127 may be a software application configured to determine lines of sight between two avatars in specific locations of the virtual world 130. The lines of sight may be determined for the present locations of two avatars, as well as predicted future locations of the avatars (i.e., locations based on predictions of future movements, as described above). In one embodiment, the lines of sight may be determined based on a specified maximum viewing distance between two avatars. If two avatars are further apart than the maximum viewing distance, the visibility engine 127 may determine that one avatar may not be visible to another avatar. Further, the lines of sight may also be determined based on any virtual objects 132 that may be located between two avatars. For example, the line of sight 282 may be affected by characteristics of an intervening virtual object 132, including the object's shape, material, openings, height, and the like. Thus, where two avatars are on opposite sides of an opaque wall having dimensions sufficient to preclude the avatars from seeing each other, then the avatars are considered as not being within a line of sight of each other. Conversely, if the same wall is transparent (and assuming no other objects) then the avatars will be considered to be within respective lines of sight.

In one embodiment, a line of sight may be determined based on a view perspective being displayed to a user (i.e., a first-person perspective or a third-person perspective). In the case of a first-person perspective, determining whether a first avatar is within a line of sight of a second avatar depends upon a field of vision of the second avatar (i.e., what is visible from the virtual eyes of the second avatar). The field of vision may vary from one virtual world to another according to well-known graphical considerations of depth perception, peripheral view, lighting, etc. Further, field of vision (and/or line of sight) may vary or depend upon characteristics of the avatar itself. For example, the second avatar may require corrective lenses. Therefore, the field of vision of the second avatar may depend upon whether the second avatar is wearing the appropriate corrective lenses. In the absence of appropriate corrective lenses, the rendering of the virtual world to a user of the second avatar may be made to appear fuzzy, thereby providing the user with a simulation of what the second avatar sees. In this case, the field of vision of the second avatar is substantially limited, relative to when the second avatar is wearing the appropriate corrective lenses.

After determining the probabilities of encountering blacklisted users, the blacklist engine 128 may also be configured to present the primary user with a display of likely encounters with blacklisted users. For example, the blacklist engine 128 may generate a text listing of likely encounters, or may generate a graphical representation of a map of the virtual world 130, with visual indicators (e.g., colors, symbols, labels, etc.) showing the likelihood of encounters within various areas of the map. Furthermore, the blacklist engine 128 may be configured to suggest alternative travel plans (e.g., alternative routes, destinations, times, etc.), so as to reduce the likelihood of encountering blacklisted users. Such alternative travel plans may reflect current and predicted lines of sight determined by the visibility engine 127.

In one embodiment, the blacklist engine 128 may also be configured to consider the avoidance level of each blacklisted user in suggesting alternative travel plans. For example, assuming that the primary user must travel to through one of two areas to reach his destination, and that each area includes equal numbers of blacklisted users, the blacklist engine 128 may recommend that the primary user travel through the area that has a lower cumulative avoidance level (i.e., the cumulative avoidance levels of all blacklisted users in the area). That is, the blacklist engine 128 may recommend that the primary user avoid the area that includes blacklisted users which are to be avoided more strongly.

In another embodiment, the blacklist engine 128 may be configured to consider a negative avoidance level assigned to other users, meaning that the primary user may wish to maximize the probability of encountering those users. For example, in the situation that the primary user has assigned a negative avoidance score to another user, the blacklist engine 128 may suggest travel plans or locations such that the primary user will have a higher likelihood of being within a line of sight of the other user.

Of course, the embodiments described above are intended to be illustrative, and are not limiting of the invention. Other embodiments are broadly contemplated. For example, the blacklist 124 and the blacklist engine 128 may be included in the client computer 110. In another example, the functionality of the blacklist engine 128 may be incorporated into the client application 109, or in the virtual world 130.

Figure 3:
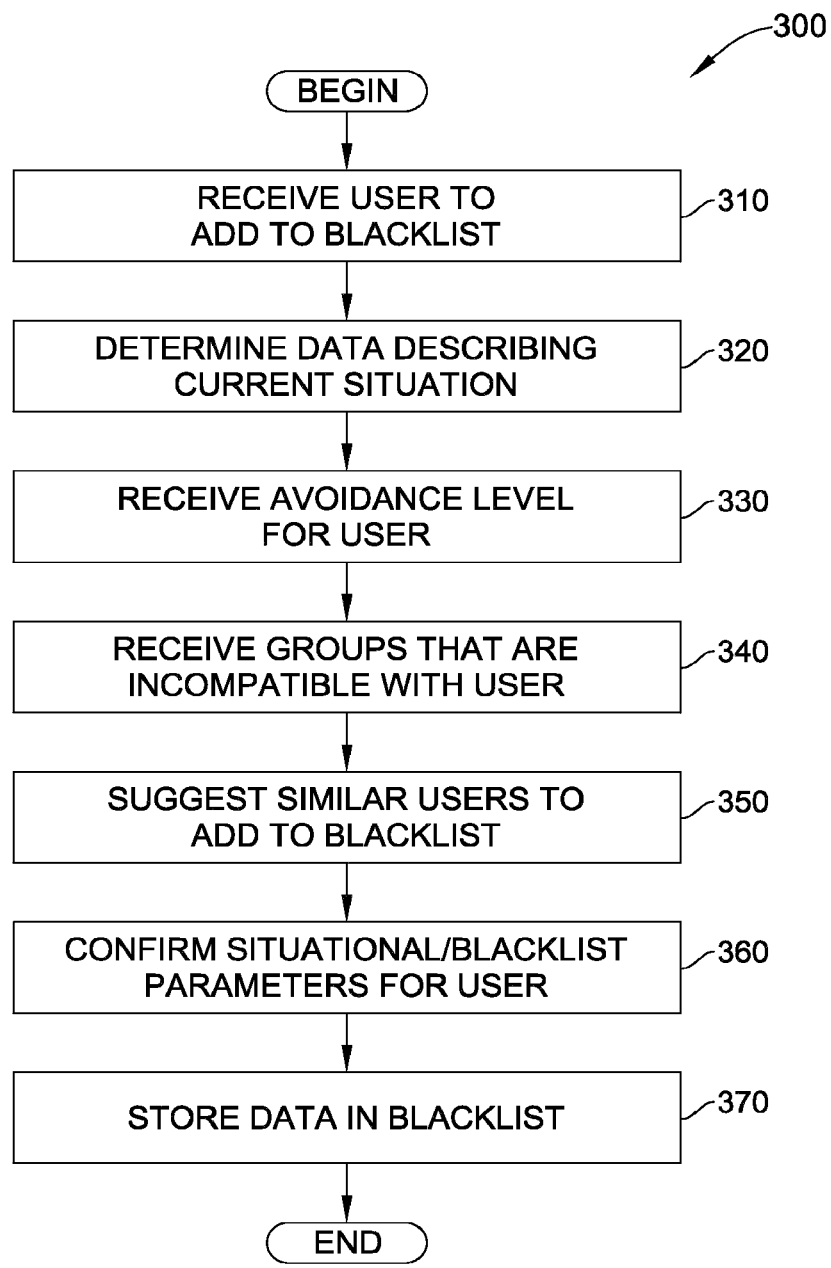
FIG. 3 is a flow diagram illustrating a method for generating a blacklist for use in avoiding specific users of an immersive virtual environment, according to one embodiment of the invention.

FIG. 3 is a flow diagram illustrating a method 300 for defining a blacklist for a user of a virtual world, according to one embodiment of the invention. Persons skilled in the art will understand that, even though the method is described in conjunction with the system of FIG. 1, any system configured to perform the steps of the method 300, in any order, is within the scope of the present invention.

The method 300 begins at step 310, by receiving a command to add a user to a blacklist. For example, a primary user may enter a command in the client application 109 for manually adding a given user to the primary user's blacklist 124. In one embodiment, the primary user may specify that the blacklisted user is to have an absolute blacklist or a situational blacklist. At step 320, data describing the current situation may be determined. For example, the blacklist engine 128 may be configured to determine characteristics of the primary user's current situation (e.g., location, profile, activity, companions, etc.), and to store the situational data in the blacklist 124. Thereafter, as described below with reference to FIG. 4, such situational data may be used in performing a method for avoiding specific users.

At step 330, an avoidance level for the blacklisted user may be received. That is, the primary user may specify a degree of preference for avoiding the blacklisted user. For example, the user may provide an avoidance level by specifying a quantitative score in the blacklist engine 128. In some situations, the primary user may wish to encounter a particular user in the virtual world. Accordingly, the primary user may specify the avoidance level as a negative number, meaning a degree of preference for encountering the user. At step 340, groups that are not compatible with the blacklisted user may be received. That is, the primary user may specify a preference for avoiding the blacklisted user while in the company of certain groups of users. For example, the primary user may interact with the blacklist engine 128 to specify that the blacklisted user is to be avoided in the situation that the primary user is in the company of a "Business Clients" group of users. At step 350, similar users may be suggested to the primary user be added to the current blacklist. That is, the primary user may be presented with additional users that have similar characteristics to the blacklisted user. The primary user may then decide whether to add any of the additional users to the current blacklist.

At step 360, the current blacklist data (i.e., the user name, avoidance level, blacklist type, situational data, etc.) may be presented to the primary user for review and approval prior to finalizing the blacklist. For example, the blacklist engine 128 may present the primary user with a summary of a situational blacklist, including the blacklisted user's name, a location, a profile, and an incompatible group. The primary user may then modify and/or approve the situational blacklist. At step 370, the current blacklist data may be stored in a blacklist data structure. For example, the blacklist engine 128 may store the blacklist data in the blacklist 124. After step 370, the method 300 terminates.

Figure 4:
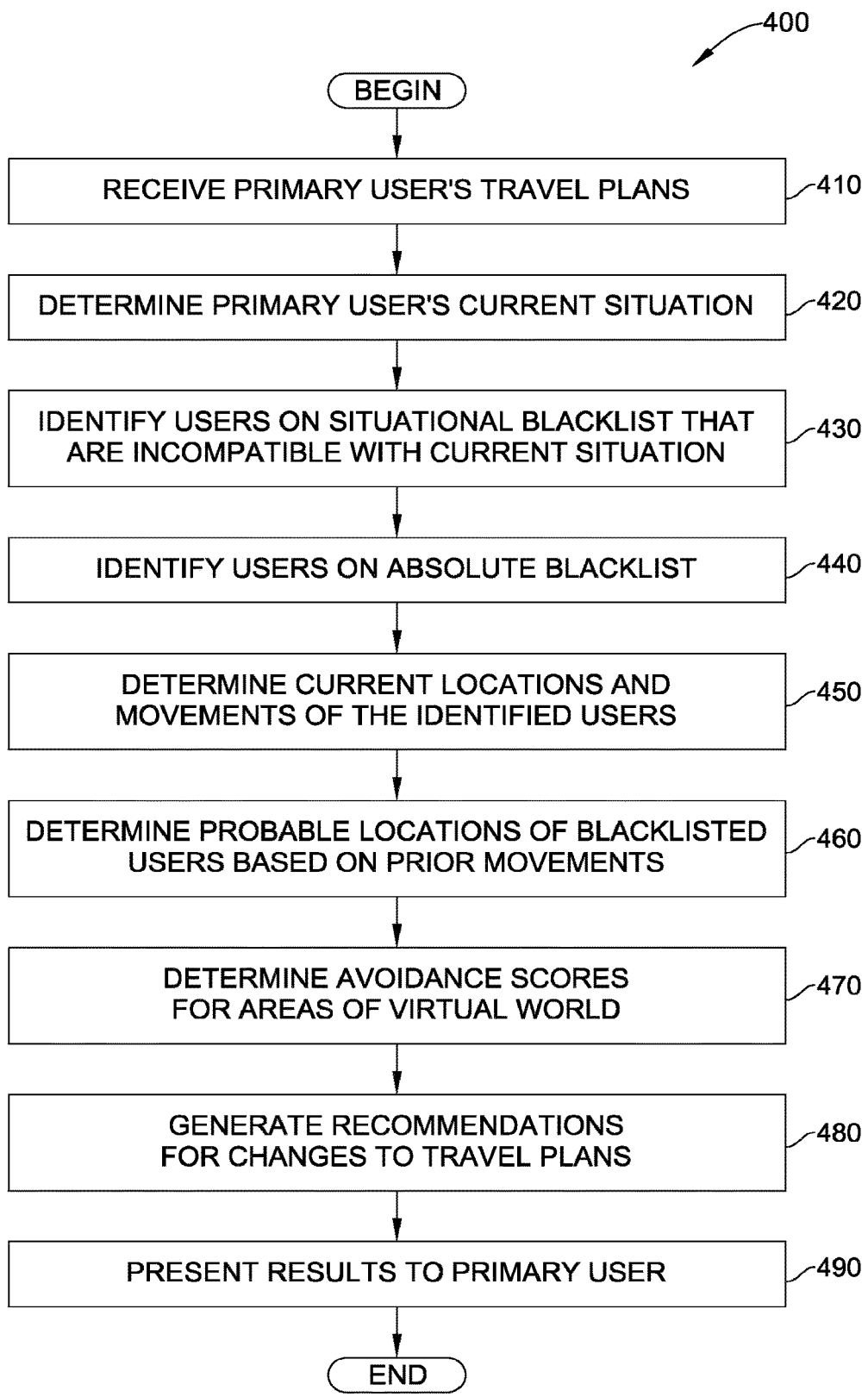
FIG. 4 is a flow diagram illustrating a method for avoiding specific users of an immersive virtual environment by using blacklists, according to one embodiment of the invention.

FIG. 4 is a flow diagram illustrating a method 400 for avoiding specific users of an immersive virtual environment by using blacklists, according to one embodiment of the invention. For the sake of illustration, method 400 is described in conjunction with the system of FIG. 1. However, persons skilled in the art will understand that any system configured to perform the steps of method 400, in any order, is within the scope of the present invention.

The method 400 begins at step 410, by receiving the primary user's travel plans within the virtual world. The primary user may provide this information, for example, by entering a list of intended destinations into a user interface provided by the client application 109, or by uploading an itinerary to the blacklist engine 128. Optionally, the blacklist engine 128 may be configured to anticipate the primary user's likely destinations based on stored records of previous travels within the virtual world.

At step 420, the primary user's current situation within the virtual world may be determined. For example, the blacklist engine 128 may be configured to determine the primary user's current profile in the virtual world (e.g., a "Work" profile, a "Gaming" profile, etc.), the primary user's current companions, and the like. At step 430, blacklisted users that are incompatible with the primary user's current situation may be identified. For example, the blacklist engine 128 may be configured to identify users that are specified in the blacklist 124 as having a situational blacklist that matches the primary user's current situation. That is, if the primary user is currently using a "Work" profile, then the blacklist engine 128 may identify any users that have a situational blacklist that specifies they are to be avoided while using the "Work" profile. At step 440, users that have an absolute blacklist (i.e., users to avoid in all situations) may be identified. For example, the blacklist engine 128 may be configured to identify users that are specified in the blacklist 124 as having an absolute blacklist.

At step 450, the current locations and movements of the identified users may be determined. For example, the blacklist engine 128 may be configured to determine the locations and movements of the blacklisted users identified at steps 430 and 440. Such location and movement information may be provided, e.g., by the virtual world 130. At step 460, the probable locations of the identified users may be determined, based on the current user locations and movements determined at step 450, as well as stored data describing any past movements of the identified users. For example, the blacklist engine 128 may be configured to determine the probable locations of the identified users based on statistical and/or probabilistic analysis of the movement history 125, which may store characteristics of the identified users' past movements (e.g., movement patterns, frequencies, times, etc.).

At step 470, avoidance scores for different areas of the virtual world may be determined. For example, the blacklist engine 128 may be configured to determine avoidance scores for areas of the virtual world 130. In one embodiment, avoidance scores are values representing the likelihood of encountering one or more blacklisted users within a given area of a virtual world. The avoidance score for a given area may be based on the number of identified users that are present in (or projected to be in) the area. The avoidance score may also be based on the avoidance level assigned to the blacklisted user, meaning the degree to which the primary user wishes to avoid the blacklisted user. Note that, in one embodiment, an avoidance level may be negative, meaning a user that the primary user wishes to encounter. The avoidance score may also be based on the likelihood that the primary user will be in a line of sight of the blacklisted user. For example, the visibility engine 127 may be used to determine the likelihood that the primary user may pass through a particular area without being in the line of sight of the blacklisted user. The blacklisted user's line of sight may be determined based on distances between avatars, and on characteristics of any intervening objects between the avatars. For example, determining the line of sight 282 may be based on virtual objects 132, as shown in FIG. 2. The avoidance score may also be based on the primary user's travel plans, as well as any planned changes in the primary user's situation (e.g., switching to a "Casual" profile, planning to meet with a family group at a given time, etc.).

At step 480, recommendations for changes to the primary user's travel plans may be generated and then results are presented to the primary user at step 490. For example, the blacklist engine 128 may be configured to compare the primary user's travel plans (received at step 410) to the avoidance scores for areas of the virtual world (determined at step 470). On the basis of this comparison, the blacklist engine 128 may generate recommendations for alternative travel plans (e.g., alternate routes, destinations, times, etc.).

While the foregoing is directed to embodiments of the present invention, other and further embodiments of the invention may be devised without departing from the basic scope thereof, and the scope thereof is determined by the claims that follow.

What is claimed is:

1. A computer-implemented method of managing avatar visual encounters in a virtual world, the method being implemented by a computer system that includes one or more physical processors executing one or more computer program instructions which, when executed, perform the method, the method comprising:
   receiving, at the computer system, from a first user, an input related to an avatar of a second user in the virtual world;
   determining, by the computer system, a first situational context that corresponds to a first situation of an avatar of the first user in the virtual world at a time of the receipt of the input, wherein the avatar of the first user has a travel plan that relates to traveling in the virtual world;
   associating, by the computer system, the input with the first situational context in a data structure;
   determining, by the computer system, a second situational context that corresponds to a second situation of the avatar of the first user in the virtual world;
   determining, by the computer system, a location of the avatar of the second user in the virtual world, wherein determining the location of the avatar of the second user comprises predicting a future location of the avatar of the second user in the virtual world based, at least in part, on a movement history of the avatar of the second user, and wherein the location of the avatar of the second user comprises the predicted future location;
   generating one or more indications related to the location of the avatar of the second user responsive to a determination that the second situational context corresponds to the first situational context, wherein the one or more indications are directed towards indicating whether the avatar of the first user will be in a line of sight of the avatar of the second user based on the predicted future location of the avatar of the second user; and
   generating, by the computer system, based on the predicted future location of the avatar of the second user, at least one alternative travel plan to be recommended for the avatar of the first user in lieu of the travel plan, wherein the at least one alternative travel plan enables the avatar of the first user to avoid being in the line of sight of the avatar of the second user.

2. The computer-implemented method of claim 1, wherein the second situation of the avatar of the first user comprises a situation in the virtual world that occurs at a time different from the time of the receipt of the input.

3. The computer-implemented method of claim 1, wherein the location of the avatar of the second user comprises a current location of the avatar of the second user in the virtual world.

4. The computer-implemented method of claim 1, wherein the first situational context relates to one or more of: (i) a location of the avatar of the first user in the virtual world at the time of the receipt of the input; (ii) a time frame associated with the receipt of the input; (iii) an avatar that the avatar of the first user is interacting with in the virtual world at the time of the receipt of the input; (iv) an activity of the avatar of the first user at the time of the receipt of the input; (v) an intended activity of the avatar of the first user at the time of the receipt of the input; (vi) a situational status of the avatar of the first user at the time of the receipt of the input; or (vii) an amount of ambient light at the time of the receipt of the input.

5. The computer-implemented method of claim 1, further comprising:
   determining, by the computer system, one or more other users based on the characteristics of the second user and the one or more other users' characteristics;
   providing, by the computer system, a presentation of the one or more other users to the first user;
   receiving, by the computer system, from the first user, one or more additional inputs related to the one or more other users responsive to the presentation of the one or more other users; and associating, by the computer system, the one or more additional inputs with the first situational context in the data structure.

6. The computer-implemented method of claim 1, further comprising:
receiving, by the computer system, from the first user, an indication of a degree of preference that the avatar of the first user avoids or encounters the avatar of the second user; and
associating, by the computer system, the received indication with the input and the first situational context in the data structure.

7. The computer-implemented method of claim 6, wherein the received indication of the degree of preference indicates a desire to visually encounter the avatar of the second user in the virtual world.

8. The computer-implemented method of claim 6, wherein the received indication of the degree of preference indicates a desire to avoid a visual encounter of the avatar of the second user in the virtual world.

9. The computer-implemented method of claim 1, wherein receiving the input from the first user comprises:
receiving an indication of the first user tagging the avatar of the second user during a visual encounter between the avatar of the first user and the avatar of the second user in the virtual world.

10. The computer-implemented method of claim 1, wherein generating the one or more indications comprises:
generating the one or more indications responsive to a determination that a current situation of the avatar of the first user in the virtual world includes the second situation and that the second situational context corresponds to the first situational context.

11. The computer-implemented method of claim 1, wherein determining the travel plan further comprises:
determining the travel plan based on one or more previous travels of the avatar of the first user in the virtual world.

12. The computer-implemented method of claim 1, further comprising:
determining, by the computer system, one or more potential views of the avatar of the second user at one or more future times associated with the travel plan of the avatar of the first user;
determining, by the computer system, a probability of the avatar of the first user visually encountering the avatar of the second user in the virtual world based on the one or more potential views; and
generating, by the computer system, one or more other indications related to the one or more future times and the probability responsive to the determination that the second situational context corresponds to the first situational context.

13. The computer-implemented method of claim 12, further comprising:
predicting, by the computer system, one or more objects between the avatar of the first user and the avatar of the second user at the one or more future times, wherein determining the one or more potential views of the avatar of the second user comprises determining the one or more potential views based on the predicted one or more objects.

14. The computer-implemented method of claim 1, further comprising:
determining, by the computer system, a future situational context that corresponds to a future situation of the avatar of the first user that is predicted to occur at a future time based on the travel plan;
predicting, by the computer system, one or more future locations of the avatar of the second user in the virtual world at the future time; and
generating, by the computer system, one or more other indications related to the one or more future locations responsive to a determination that the future situational context corresponds to the first situational context.

15. A system for managing avatar visual encounters in a virtual world, the system comprising:
one or more physical processors programmed with one or more computer program instructions which, when executed, cause the one or more physical processors to:
receive, from a first user, an input related to an avatar of a second user in the virtual world;
determine a first situational context that corresponds to a first situation of an avatar of the first user in the virtual world at a time of the receipt of the input;
associate the input with the first situational context in a data structure;
determine a second situational context that corresponds to a second situation of the avatar of the first user in the virtual world, wherein the avatar of the first user has a travel plan that relates to traveling in the virtual world;
determine a location of the avatar of the second user in the virtual world, wherein determining the location of the avatar of the second user comprises predicting a future location of the avatar of the second user in the virtual world based, at least in part, on a movement history of the avatar of the second user, and wherein the location of the avatar of the second user comprises the predicted future location;
generate one or more indications related to the location of the avatar of the second user responsive to a determination that the second situational context corresponds to the first situational context, wherein said one or more indications are directed towards indicating whether the avatar of the first user will be in a line of sight of the avatar of the second user based on the predicted future location of the avatar of the second user; and
generating, by the computer system, based on the predicted future location of the avatar of the second user, at least one alternative travel plan to be recommended for the avatar of the first user in lieu of the travel plan, wherein the at least one alternative travel plan enables the avatar of the first user to avoid being in the line of sight of the avatar of the second user.

16. The system of claim 15, wherein the one or more physical processors are further caused to:
receive, from the first user, an indication of a degree of preference that indicates a desire to visually encounter the avatar of the second user in the virtual world; and
associate the received indication with the input and the first situational context in the data structure.

17. The system of claim 15, wherein the one or more physical processors are further caused to:
receive, from the first user, an indication of a degree of preference that indicates a desire to avoid a visual encounter of the avatar of the second user in the virtual world; and
associate the received indication with the input and the first situational context in the data structure.

18. A computer-readable storage medium comprising executable code for managing avatar visual encounters in a virtual world, the computer executable code, when executed by one or more physical processors, causing the one or more physical processors to:

receive, from a first user, an input related to an avatar of a second user in the virtual world;

determine a first situational context that corresponds to a first situation of an avatar of the first user in the virtual world at a time of the receipt of the input;

associate the input with the first situational context in a data structure;

determine a second situational context that corresponds to a second situation of the avatar of the first user in the virtual world, wherein the avatar of the first user has a travel plan that relates to traveling in the virtual world;

determine a location of the avatar of the second user in the virtual world wherein determining the location of the avatar of the second user comprises predicting a future location of the avatar of the second user in the virtual world based, at least in part, on a movement history of the avatar of the second user, and wherein the location of the avatar of the second user comprises the predicted future location;

generate one or more indications related to the location of the avatar of the second user responsive to a determination that the second situational context corresponds to the first situational context, wherein said one or more indications are directed towards indicating whether the avatar of the first user will be in a line of sight of the avatar of the second user based on the predicted future location of the avatar of the second user; and generating, by the computer system, based on the predicted future location of the avatar of the second user, at least one alternative travel plan to be recommended for the avatar of the first user in lieu of the travel plan, wherein the at least one alternative travel plan enables the avatar of the first user to avoid being in the line of sight of the avatar of the second user.

* * * * *